(12) United States Patent
Whitney et al.

(10) Patent No.: US 8,696,517 B2
(45) Date of Patent: *Apr. 15, 2014

(54) SYSTEM AND METHOD OF CONTROLLING CRANKSHAFT TORQUE DURING A TRANSMISSION SHIFT WITH TORQUE CAPACITY-BASED TORQUE REDUCTION RANGE SELECTION

(75) Inventors: Christopher E. Whitney, Commerce, MI (US); Mark A. Schang, Milford, MI (US); Jeffrey M. Kaiser, Highland, MI (US); Andrew W. Baur, Whitmore Lake, MI (US); Ning Jin, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 301 days.

This patent is subject to a terminal disclaimer.

(21) Appl. No.: 13/213,334

(22) Filed: Aug. 19, 2011

(65) Prior Publication Data

US 2013/0045832 A1 Feb. 21, 2013

(51) Int. Cl.
*B60W 10/04* (2006.01)
*B60W 10/10* (2012.01)

(52) U.S. Cl.
USPC ........................................................ 477/107

(58) Field of Classification Search
USPC .......... 477/3, 107, 111, 115, 121; 701/51, 54
See application file for complete search history.

(56) References Cited

U.S. PATENT DOCUMENTS

| | | | | |
|---|---|---|---|---|
| 5,496,227 | A * | 3/1996 | Minowa et al. | 477/62 |
| 6,364,811 | B1 | 4/2002 | Hubbard et al. | |
| 7,980,221 | B2 * | 7/2011 | Baur et al. | 123/435 |
| 8,214,127 | B2 * | 7/2012 | Whitney et al. | 701/102 |
| 8,255,139 | B2 * | 8/2012 | Whitney et al. | 701/101 |
| 2011/0144887 | A1 * | 6/2011 | Whitney et al. | 701/103 |
| 2013/0045835 | A1 * | 2/2013 | Schang et al. | 477/78 |

* cited by examiner

*Primary Examiner* — Justin Holmes
(74) *Attorney, Agent, or Firm* — Quinn Law Group, PLLC

(57) ABSTRACT

A control system for use with an engine and a transmission in a vehicle is provided that includes at least one controller having a processor with at least one stored algorithm that determines different crankshaft torque capacities associated with different respective torque actuators including a relatively slow torque actuator, such as an airflow actuator, and at least one relatively fast torque actuator, such as a spark actuator or a fuel actuator. The algorithm determines a torque actuation range over which to modify engine torque during an oncoming shift of the transmission. The torque actuation range may be based at least partially on a target gear of the upshift, desired shift duration, and a vehicle operating condition indicative of an operator intent regarding shift duration. Requests for torque modification by use of the torque actuators are then made to provide the torque actuation range.

16 Claims, 3 Drawing Sheets

SYSTEM AND METHOD OF CONTROLLING CRANKSHAFT TORQUE DURING A TRANSMISSION SHIFT WITH TORQUE CAPACITY-BASED TORQUE REDUCTION RANGE SELECTION

TECHNICAL FIELD

The invention relates to a control system and method to control engine torque during a transmission shift.

BACKGROUND

Automatic transmissions typically will use a torque reduction of the engine when performing an upshift. An upshift is when the transmission shifts from a gear with a higher numerical multiplication ratio to a lower numerical multiplication ratio, such as a shift from second gear to third gear. When this is done, the engine speed must slow down to provide a speed that corresponds with the transmission output speed multiplied by the transmission gear block ratio. To slow down the engine faster without wearing the transmission clutch material excessively or providing an acceleration to the driver, the engine torque is decreased quickly and then brought back up to a torque corresponding with the transmission output torque.

The airflow torque (i.e., engine torque affected by the throttle, a turbobooster system and/or a supercharger system, and valve phasers) during an automatic transmission upshift will typically increase during the shift because it takes a higher engine torque to make the same axle torque with a lower numerical ratio gear. There is typically a delay between requesting an airflow torque and achieving it.

In known systems, during an upshift, the transmission control module will usually issue an immediate torque reduction request that is satisfied with spark retard. The spark retard takes energy out of the combustion event and puts it into the exhaust system as heat. The immediate torque request brings down the engine torque to be able to aid in bringing down the engine speed during the shift. Toward the end of the shift, the immediate torque request will start ramping up again (i.e., request a higher torque value) to give torque back to the normal driver control path (based on the airflow request and sent from the engine controller to the transmission controller) with optimal efficiency.

SUMMARY

The use of spark retard for torque reduction during a shift is advantageous because it is a fast actuator that can remove torque quickly and bring it back quickly, providing a finely tuned control of crankshaft torque. Furthermore, spark retard does not significantly impact emissions unless retarded to such a degree as to cause engine misfire. However, spark retard may negatively impact fuel economy, because the same amount of fuel is injected when the spark is retarded, causing a larger amount of the combustion event energy to be wasted as heat in the exhaust rather than converted to mechanical work into the engine.

There is a need for transmissions capable of shorter shift times and greater range of authority under some operating conditions than what can be delivered with spark retard alone. As used herein, "range of authority" means the amount of torque reduction that can be achieved during a shift using a specific torque actuator or set of actuators.

Accordingly, a control system for use with an engine and a transmission in a vehicle is provided that includes at least one controller having a processor with at least one stored algorithm that determines different crankshaft torque capacities associated with different respective torque actuators including a relatively slow torque actuator and at least one relatively fast torque actuator. For example, the relatively slow actuator may be an airflow torque actuator, and the relatively fast actuator may be either or both of a spark actuator and a fuel actuator. The algorithm then determines a torque actuation range over which to modify crankshaft torque during an oncoming shift of the transmission. The torque actuation range may be based at least partially on a target gear of the upshift, a desired shift duration, and a vehicle operating condition indicative of an operator intent regarding shift duration. Crankshaft torque modification by use of at least one of the relatively slow actuator and the relatively fast actuator is then requested based at least partially on the torque actuation range and the crankshaft torque capacities.

According to the algorithm, the relatively slow torque actuator and the relatively fast torque actuator may be requested independently from one another prior to and during the shift based on the crankshaft torque capacities associated with the actuators and the torque actuation range. In one embodiment, the determination of different crankshaft torque capacities is carried out by a first algorithm in an engine control unit, while the determination of torque actuation range is carried out by a second algorithm in a transmission control unit, which then makes requests to the engine control unit for use of the different actuators for crankshaft torque modification. The airflow actuator may be requested prior to the spark actuator to accommodate the delay in effect of the commanded airflow actuator on crankshaft torque. In one embodiment, the algorithm requires fuel shutoff to all engine cylinders when torque reduction via the fuel actuator is requested.

The request for the relatively slow actuator may be referred to as a "predicted" crankshaft torque request and the request for the relatively fast actuator may be referred to as an "immediate" crankshaft torque request. The predicted crankshaft torque request includes a requested torque value (i.e., magnitude of torque and whether torque is increasing or decreasing), and a requested torque intervention type. The requested torque intervention type may be for no torque intervention, a maximum torque limit, or a minimum torque. The immediate crankshaft torque request includes a requested torque value and a requested torque response type. The torque response type may be for no torque intervention, a limited range of reduction request, a maximum range of reduction request, or an automatic actuator selection request that instructs modification of a requested torque value for the predicted crankshaft torque request to ensure that the requested torque value for immediate crankshaft torque request is achieved.

The above features and advantages and other features and advantages of the present invention are readily apparent from the following detailed description of the best modes for carrying out the invention when taken in connection with the accompanying drawings.

DETAILED DESCRIPTION

Figure 1:
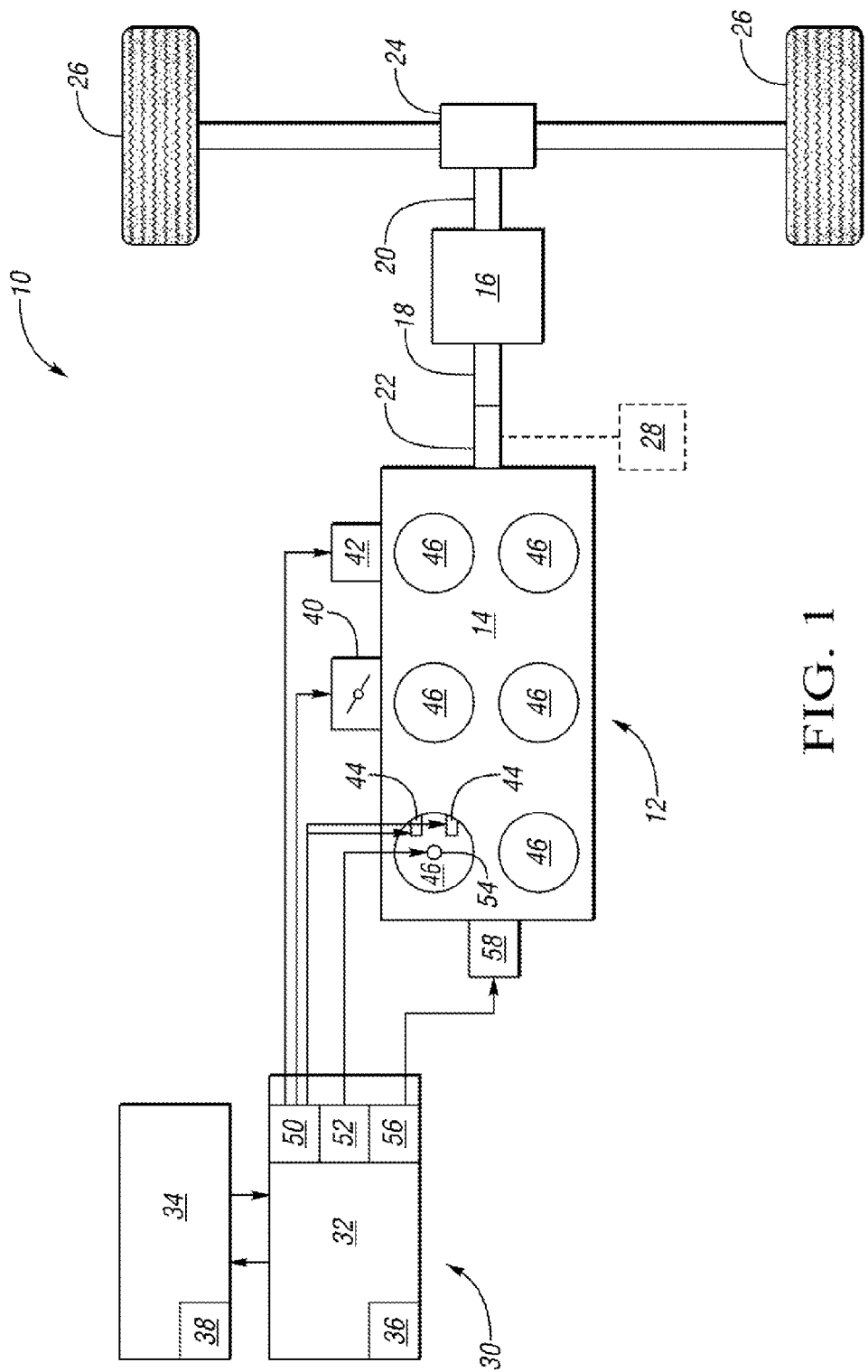
FIG. 1 is a schematic illustration of a vehicle powertrain having a control system for an engine and a transmission.

Referring to the drawings, wherein like reference numbers refer to like components throughout the several views, FIG. 1 shows a vehicle 10 having a powertrain 12 that includes an engine 14 and a transmission 16. The engine 14 is a spark-ignited internal combustion engine. In another embodiment, the engine 14 may be a diesel engine without the spark actuation discussed herein. The transmission 16 may be an automatic transmission having a plurality of intermeshing gears and selectively engageable clutches that establish different speed ratios between a transmission input member 18 and a transmission output member 20. A crankshaft 22 of the engine 14 is connectable for rotation with the transmission input member 18 to provide torque from the input member 18 to the output member 20 at a gear ratio established by the transmission 16. Torque from the output member 20 is provided through a final drive mechanism 24 to vehicle wheels 26. In some embodiments, the vehicle 10 is a hybrid vehicle having one or more electric motor/generators. For example, a motor/generator 28 may be connected with the crankshaft 22 by a belt and pulley arrangement or otherwise, and controllable to provide torque to increase torque at the crankshaft 22 or to decrease torque at the crankshaft 22, such as when operated as a generator in a regenerative braking mode.

The vehicle 10 has a control system 30 that includes an engine control module (ECM) 32 and a transmission control module (TCM) 34. The ECM 32 may be referred to as a first controller and the TCM 34 may be referred to as a second controller. The ECM 32 and TCM 34 are operatively connected with one another to coordinate control of the engine 14 and the transmission 16. Alternatively, the ECM 32 and the TCM 34 may be configured as a single powertrain control module having the functionality of both the ECM 32 and the TCM 34.

The ECM 32 has a processor 36 operable to control engine functions. For example, the processor 36 has a stored algorithm that determines torque commanded at the crankshaft 22 by the ECM 32 based on vehicle operating conditions, driver input and, as described herein, requests from the TCM 34 for torque management prior to and during transmission shifts. As further described with respect to FIG. 3, the algorithm also determines different torque capacities at the crankshaft 22 (i.e., the torque provided at the crankshaft 22) available when different torque actuators are controlled to be at different states. As used herein, a "torque actuator" is a system that varies an engine parameter that affects crankshaft torque. For example, some of the torque actuators that are controllable by the ECM 32 to modify torque at the crankshaft 22 include an airflow actuator or actuator module 50 that controls air flow to engine cylinders 46, a spark actuator or actuator module 52 that controls spark ignition timing, and a fuel actuator or actuator module 56 that controls fuel to the engine cylinders 46. The TCM 34 also has a processor 38 with an algorithm that is operable to control the timing and duration of transmission shifts, as well as to determine a range of torque reduction at the crankshaft 22 to be requested of the ECM 32 during a shift of the transmission 16, such as an upshift. The range of torque reduction requested is based at least in part on the torque capacities determined by the ECM 32.

A request for torque or an amount of torque reduction or removal of torque reduction via control of spark, fuel or electric motor/generator is referred to as an immediate torque request or a request for immediate torque, while a request for torque or an amount of torque reduction due to control of airflow is referred to as a predicted torque request or a request for predicted torque. Changes to spark timing and changes to fuel delivery, such as fuel shutoff (also referred to as fuel cut), occur relatively quickly in comparison to a change to airflow, as further discussed herein. Airflow is therefore referred to as a relatively slow torque actuator, while spark timing and fuel shutoff are referred to as relatively fast torque actuators.

The airflow actuator provided by the engine 14 affects the torque at the crankshaft 22 due to control of airflow through the throttle 40, such as by opening or closing the throttle 40 to a greater or lesser degree, control of airflow through turbo-boosters or superchargers 42 to affect air pressure in the engine 14, and control of airflow through cam phasers 44 that control the timing of inlet valves and exhaust valves for engine cylinders 46. The airflow actuator may be part of the airflow actuator module 50 that sends actuation signals to the throttle 40, the turbobooster and/or supercharger 42 and the phasers 44. Control of torque by changes to airflow has an inherent delay between actuation or implementation of an airflow torque request and the effect of the request on crankshaft torque. Therefore, such a request is referred to as a predicted request as it is for an affect on crankshaft torque that is predicted to occur after some delay after the actuation occurs. For example, a change in throttle position will not have a full effect on crankshaft torque until air currently in the manifold and cylinders 46 is pushed through the engine 14. The response in time of crankshaft torque to a predicted torque request can vary based on many factors because of the nature of airflow control. One such factor is engine speed. Performing shifts with a predicted and immediate torque reduction can provide more overall reduction than with immediate torque reduction alone. However, more coordination of the timing of the torque requests may be necessary due to the nature of the response to predicted torque requests on gas spark-ignited engines.

The spark actuator may be a part of the spark actuation module 52 that sends actuation signals to control the timing of the spark generated by spark plugs 54 (one shown) relative to top dead center (TDC) of the pistons within the cylinders 46. For a given engine combustion mixture there is an optimum spark timing that is a function of engine speed, the amount of combustible air in the mixture, charge temperature and other factors. Timing the spark later than this optimum spark timing is referred to as spark reduction as it causes the combustion within the cylinder 46 to produce less torque at the crankshaft 22.

The fuel actuator may be part of a fuel actuation module 56 that sends actuation signals to control fuel flow such as through a fuel injector 58 for each of the cylinders 46 (one shown). When the fuel torque actuation signal is for fuel shutoff to occur, no combustion takes place in the cylinders 46 and crankshaft torque is significantly reduced.

Figure 2:
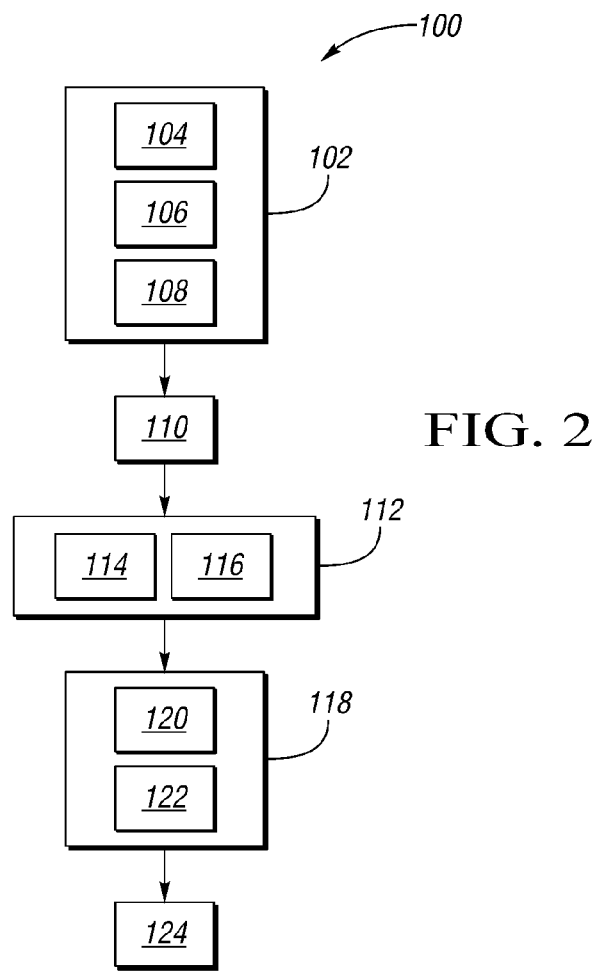
FIG. 2 is a schematic illustration of a flow diagram of a method of controlling crankshaft torque relative to a transmission shift event.
Figure 3:
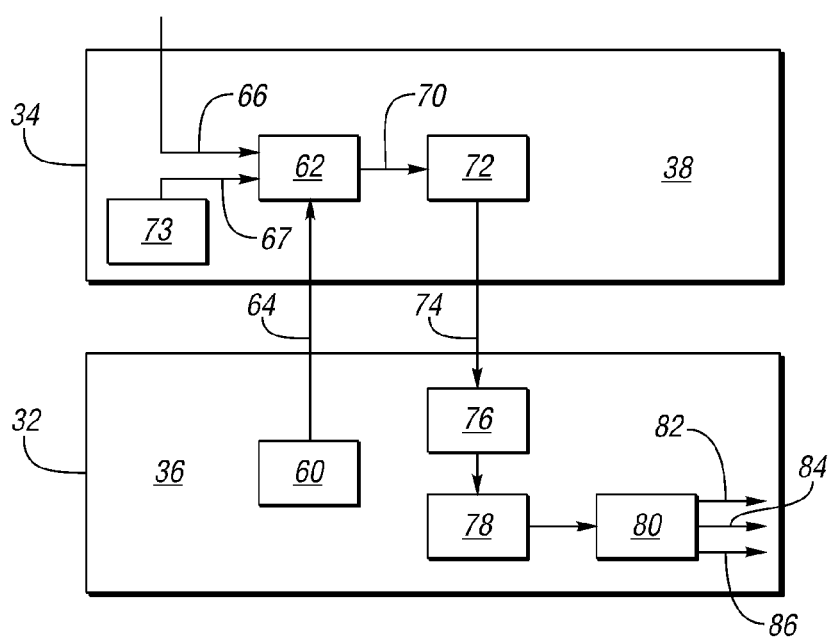
FIG. 3 is a schematic illustration of one embodiment of the control system showing inputs and outputs to algorithms that control engine torque during the shift event.

Referring to FIG. 2, a method 100 of controlling crankshaft torque prior to and during a shift in the transmission 16 is shown schematically. FIG. 3 depicts schematically the algorithms and functionality of the ECM 32 and TCM 34 that carry out the method 100 of FIG. 2. The method 100 begins with block 102, in which crankshaft torque capacities associated with different torque actuators are determined. The torque actuators include both a relatively slow torque actuator, such as an airflow actuator, as well as a relatively fast torque actuator, such as a spark actuator and/or a fuel actuator. In the embodiment shown, block 102 is carried about by the ECM 32, such as by a torque estimator algorithm 60 of the ECM 32, shown in FIG. 2. Block 102 may include blocks 104, 106 and 108. In block 104, the crankshaft torque at the current airflow (i.e., airflow response to recent settings of the throttle 40, turbobooster and/or supercharger 42, and phasers 44), with motor/generator 28 set to its maximum negative torque, and with the timing of the engine spark set for minimum spark, is determined and is communicated to the TCM 34 as one of a set of electronic signals represented by arrow 64 shown in FIG. 2. The crankshaft torque at the current airflow and with minimum spark may be referred to as "crankshaft torque minimum immediate capacity". As used herein, "minimum spark" is a predetermined setting providing a maximum amount of spark retardation without causing engine misfire. In other words, when the spark is set for minimum spark, a minimum amount of crankshaft torque that can be provided by the spark actuator module 52 is provided. Crankshaft torque minimum immediate capacity rather than engine torque minimum immediate capacity is used, especially on hybrid systems, so that the affect of an electric motor/generator, such as motor/generator 28, that can contribute to crankshaft torque is accounted for in the determination.

In block 106, the crankshaft torque with minimum airflow (i.e., settings of the throttle 40, turbobooster and/or supercharger 42, and phasers 44 to provide a minimum amount of torque possible) and with the timing of the engine spark set for minimum spark, is determined. This may be referred to as "crankshaft torque minimum run immediate capacity".

In block 108, the crankshaft torque with minimum airflow and with fuel to the cylinders 46 shutoff is determined. This may be referred to as "crankshaft torque minimum off capacity". Under these torque settings, even though fuel to the cylinders 46 is shutoff, setting the airflow to a minimum still increases the range of torque reduction that can be achieved (i.e., provides a lower magnitude torque capacity) because of increased pumping losses associated with the cylinders 46 pulling airflow across a smaller opening in the throttle when airflow is minimized.

Each of the determinations in blocks 104, 106 and 108 involves a crankshaft torque capacity achieved by a combination of a slow torque actuator (e.g., the airflow actuator) and a fast torque actuator (e.g., the spark actuator or the fuel actuator). Each of the torque capacities determined in block 102 of the method 100 are sent as electronic signals from the torque estimator algorithm 60 of the ECM 32 to a torque actuation range algorithm 62 of the TCM 34 as represented by arrow 64 in FIG. 3. The method 100 then proceeds to block 110 in which the TCM 32 determines the torque actuation range necessary from the engine 12 (as well as from the motor/generator 28 in a hybrid powertrain) in order to request the optimal combination of shift time, clutch pressures and engine torque actuation to achieve the shift. The torque actuation range algorithm 62 receives input information in the form of electronic signals, represented by arrow 66 in FIG. 3. The input information includes information that a shift has been commanded, and the target gear of the transmission gear shift. For example, if the gear shift is from second gear to third gear (i.e., an upshift), the torque actuation range algorithm 62 receives this information from other algorithms within the transmission control module 34, such as from a stored lookup table that determines an appropriate gear for the transmission 16 based on driver intent and vehicle speed. The input information also includes driver intent, as may be determined from the accelerator pedal position and any specific operation mode selected by the driver (such as sport mode, tap mode, etc.), and may be referred to as driver-requested torque. The torque actuation range algorithm 62 determines a torque actuation range over which the torque should be modified during the shift based on the torque capacity information and the additional input information received from the ECM 32.

The transmission control algorithm in the processor 38 may also associate driver-requested torque and vehicle speed with a predetermined shift duration deemed to be desirable. The shift duration may include a torque phase and an inertia phase. During the torque phase, clutches within the transmission 16 are being filled or exhausted as necessary to establish the predetermined clutch engagements for the target gear. During the inertia phase, the speed change of the crankshaft 22 occurs due to the newly established gear ratio through the transmission 16. At a relatively high vehicle speed and relatively high driver-requested axle torque or acceleration, the algorithm may assign a shorter desired shift duration than if the same shift were requested at a relatively low driver-requested axle torque. That is, the shift may be allowed to be more aggressive at high driver-requested axle torques.

Additional input information 67 to the torque actuation range algorithm 62 may include a predetermined maximum upshift torque management estimate determined by another algorithm of the processor 38 that assigns an estimate of the maximum amount of torque reduction that is expected from a clutch control algorithm 73 for the specific upshift. This estimate may be based at least in part on the mechanical limitations of the shift, such as the tooth ratios of the intermeshing gears, and clutch fill pressures.

Once the torque actuation range algorithm 62 of the processor 38 of the TCM 34 determines a torque actuation range needed in order to accomplish the desired driver intent and desired shift duration, the actuation range needed is sent as an electronic signal represented by arrow 70 to a torque request algorithm 72 of the processor 38 of the TCM 34 that determines the timing, value and type of torque requests to be sent to the ECM 32. The torque requests are determined in block 112 of the method 100 by comparing the torque actuation range needed (as determined in block 110) to the torque capacities determined in block 102. In other words, because the torque reduction capabilities of the various torque actuators are known, torque requests can be made that best meet the torque actuation range needed given the available amounts of torque reduction that can be achieved by the various torque actuators.

Block 112 includes both block 114 and 116. In block 114, the method 100 determines a torque request value, and torque intervention type to be requested of the airflow actuators of the engine 12 corresponding with all points in time during a period of time just prior to an impending shift and during shift execution (i.e., prior to and during torque phase and inertia phase). The torque request value and torque intervention type for the airflow actuators are referred to as the predicted crankshaft torque request and may vary as time progresses before and during the shift. In block 114, the torque request value represents the amount of torque to be achieved at the crankshaft 22 by control of the airflow actuators.

The torque intervention type for the airflow torque request may be one of three types: no intervention, a maximum torque limit, and a minimum torque limit. A torque intervention type of no torque intervention is a request that no intervention be made with respect to the airflow actuators, and that the throttle 40, turbobooster and/or supercharger 42 and phasers 44 should not be manipulated for purposes of torque management prior to or during the shift but should remain at their current, steady-state (non-shift period) settings. A torque intervention type of a maximum torque limit is a request to set the airflow actuators so that a maximum crankshaft torque is not exceeded. This setting can be used to decrease torque from the driver-requested level. The request is for airflow actuators to be manipulated, reducing torque if necessary so that crankshaft torque does not exceed the maximum limit. A torque intervention type of a minimum torque limit is a request to set the airflow actuators so that at least a minimum crankshaft torque is provided, increasing torque if necessary, so that crankshaft torque does not fall below the minimum torque limit. This setting can be used to increase torque above the driver-requested level.

In block 116, the method 100 determines a torque request value, and torque response type to be requested of the fast torque actuators (i.e., spark actuator and fuel actuator) of the engine 12 corresponding with all points in time during a period of time just prior to an impending shift and during shift execution (i.e., prior to and during torque phase and inertia phase). The torque request value, and torque response type for the fast actuators are referred to as an immediate crankshaft torque request because there is very little delay in effect on crankshaft torque when such a torque request is commanded. The direction of an immediate torque request is typically inferred as decreasing or "maximum limit" because of the nature of spark reduction and fuel cut off to only be able to decrease torque from the driver-requested level on gasoline engines. The immediate crankshaft torque request may vary as time progresses before and during the shift. In block 116, the torque request value represents the amount of torque to be achieved at the crankshaft 22 by control of spark timing by the spark actuation module 52 and control of fuel by the fuel actuation module 56.

The torque response type for the immediate crankshaft torque request may be one of four types: inactive, pleasability-limited, maximum range, and automatic actuator selection. A torque response type of inactive is a request that no intervention be made with respect to the fast actuators, and that the spark timing and fuel to cylinders 46 should not be manipulated for purposes of torque management prior to or during the shift. Instead, the immediate crankshaft torque request is set to its maximum value (i.e., optimum calibrated steady-state spark timing and fuel to all cylinders 46).

A requested torque response type of "pleasability-limited" is a request for a relatively quick and smooth response with the range of torque reduction possibly limited based on the abilities of the available fast actuators. This limit on the range of torque reduction is referred to as the immediate torque minimum limit and may change with operating conditions, even during a shift. This torque response type is normally achieved with manipulation of the spark actuator only (i.e., spark retard) for a spark-ignited internal combustion engine, but may require use of additional fast actuators in other types of propulsion systems. For purposes of example only, if a current predicted crankshaft torque value is 150 Nm and a pleasability-limited request of 100 Nm is made, if the immediate torque minimum limit (the crankshaft torque value achieved with torque reduction using the spark actuator only) is 90 Nm, then the spark will be retarded and the request will be achieved. However, if the immediate minimum torque limit is 110 Nm, then the spark will be retarded to its minimum advance for combustion and the torque at the crankshaft 22 will only decrease to 110 Nm (i.e., the request will not be fully achieved). When the request is removed (at the completion of the shift), the spark will return to its calibrated level almost instantaneously.

A requested torque response type of "maximum range" is a request for a fast torque reduction at the maximum available range of crankshaft torque reduction that can be achieved using the fast actuators. The "pleasability" (i.e., smoothness) of the shift is reduced in favor of providing increased reduction range. This response is most likely achieved with both spark actuator and fuel actuator on a spark-ignited internal combustion engine, but may be achieved with other torque actuators on other types of propulsion systems. For purposes of example only, if the current predicted crankshaft torque value is 150 Nm and a torque request type of maximum range is for 100 Nm, if the maximum range torque minimum limit is −10 Nm (crankshaft torque with both fuel cutoff and spark retard), then the fuel actuator may reduce torque by 40 Nm by cutting fuel to the cylinders 46, and the spark actuator may be used to further reduce the torque by 10 Nm to 100 Nm. When the request is removed, the fuel will be turned on to the cylinders 46, and the spark timing will return to the calibrated timing, returning the crankshaft torque to the predicted torque value almost immediately. In a system that permits fuel cutoff to less than all of the cylinders 46, achieving the maximum range request may be possible with fuel cutoff to only some of the cylinders.

A requested torque response type of automatic actuator selection is a request to follow the pleasability-limited torque request but to modify the predicted crankshaft torque request value to ensure that the requested immediate torque value is achievable. Because the predicted torque actuator (i.e., the airflow actuator) may be used to achieve this request, the response rate of this request may be slower than the pleasability-limited torque response type and the maximum range torque response type. For purposes of example only, if the current predicted crankshaft torque value is 150 Nm and the automatic actuator selection torque response type request is 50 Nm (i.e., the request is to achieve a crankshaft torque value of 50 Nm), if the immediate torque minimum limit (the crankshaft torque value achieved by the spark actuator alone) is 70 Nm, then the automatic actuator selection response type request cannot be achieved by the spark actuator alone. The automatic actuator selection response type request thus includes a request to modify the predicted crankshaft torque request value to a value 20 Nm lower, and use the airflow actuator to cause the throttle 40 to be closed by an amount to reduce crankshaft torque by 20 Nm. The spark is then retarded to its minimum advance for combustion (i.e., to achieve its greatest torque reduction) so that the maximum range request of 50 Nm at the crankshaft 22 is achieved. Because the automatic actuator selection response type torque request is achieved using the airflow actuator as well as the spark actuator, when the request is removed, torque at the crankshaft 22 will not be recovered immediately, as there is a delay between the time the throttle 40 is opened and the greater airflow reaches the cylinders 46 for combustion.

The crankshaft torque requests prior to and during the shift as determined in block 112 and by the torque request algorithm 72 in FIG. 3 are then communicated to the ECM 32 as represented by arrow 74. The method 100 then moves to block 118 in which the ECM 32 evaluates the transmission torque requests in an evaluation algorithm 76 depicted in FIG. 3 that determines the settings required of the throttle 40, the turbobooster and/or supercharger 42, the cam phasers 44, the spark timing, the fuel state and the actuation command signals required from the respective actuation modules 50, 52, 56 to affect these settings and deliver the torque requests. Block 118 may include block 120, in which the method 100 arbitrates the transmission torque requests by a comparison of the transmission torque requests with other propulsion torque requests in an arbitration algorithm 78. Other propulsion torque requests may include torque reductions for engine over-speed protection, torque increases for stall prevention, or an engine shutoff request for a critical fault detected, such as a vehicle theft or a stuck throttle. In block 120, these competing requests are prioritized or used to modify the crankshaft torque request from the TCM 34.

Block 118 may also include block 122, in which an engine torque actuation algorithm 80 depicted in FIG. 3 ensures that an actuation of fuel cutoff is for cutoff to all cylinders 46 if fuel cutoff to only selected cylinders is not permitted under the predetermined actuation algorithm. Under the method 100, in block 124, actuation commands are then sent as electronic signals by the engine torque actuation algorithm 80 to the airflow actuation module 50, the spark actuation module 52, and the fuel actuation module 56, as represented by arrows 82, 84, 86, respectively.

Figure 4:
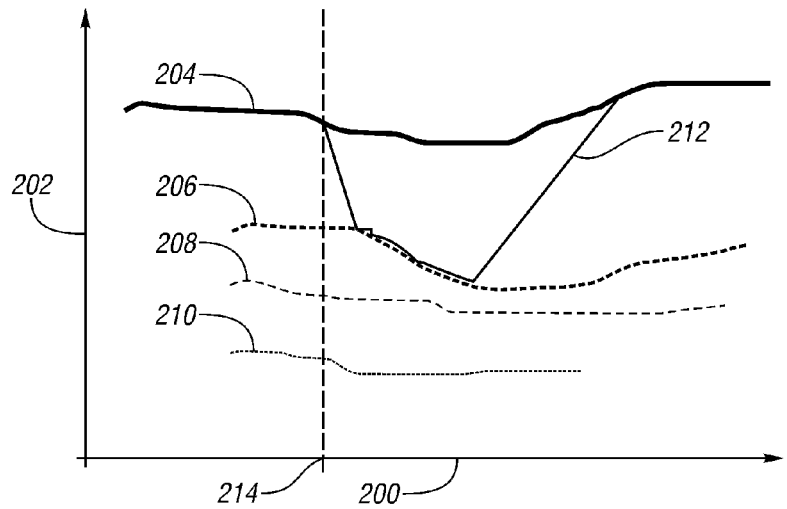
FIG. 4 is a plot of torque on the vertical axis verses time on the horizontal axis illustrating torque management pursuant to the algorithms for crankshaft torque reduction during a shift of the transmission using a torque request for a spark actuator.
Figure 5:
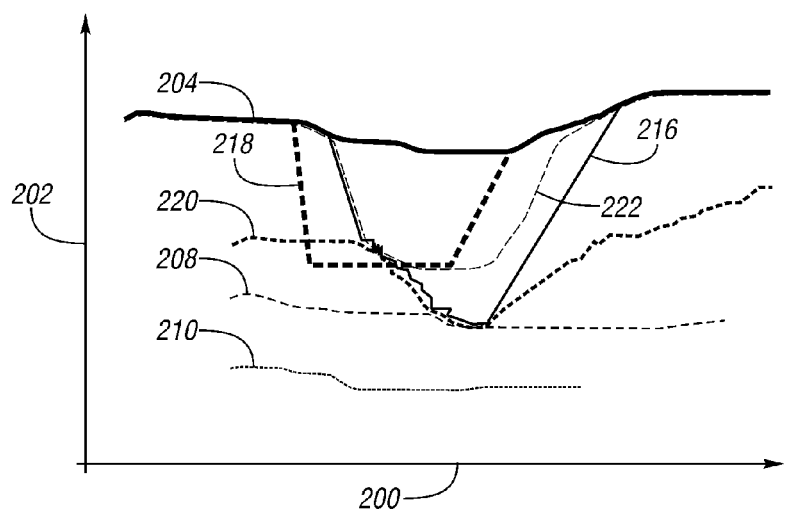
FIG. 5 is another plot of torque on the vertical axis verses time on the horizontal axis illustrating torque management pursuant to the algorithms for crankshaft torque reduction during a shift of the transmission using a torque request for an airflow actuator leading a torque request for a spark actuator.
Figure 6:
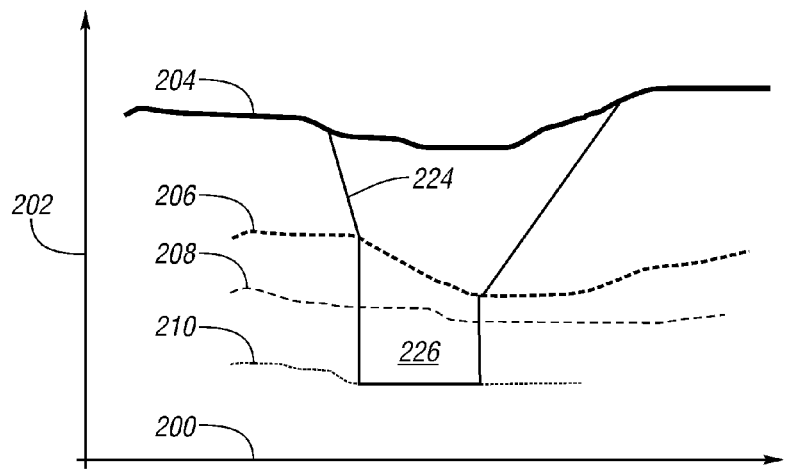
FIG. 6 is another plot of torque on the vertical axis verses time on the horizontal axis illustrating torque management pursuant to the algorithms for crankshaft torque reduction during a shift of the transmission using a request for no torque intervention by the airflow actuator and a request for a fuel cutoff actuator

FIGS. 4, 5 and 6 schematically illustrate the shift torque management carried out prior to and during a shift with a transmission torque request based on the crankshaft torque capacities of the different torque actuator combinations, as discussed with respect to the method 100. FIG. 4 is a diagram of a transmission torque request during a "power on" transmission upshift with torque reduction. In the diagram, time increases along the horizontal axis 200 to the right, while torque at the crankshaft 22 increases along the vertical axis 202. The term "power on" applies to situations where the driver is depressing the accelerator pedal and the engine is producing significant positive propulsion torque. Under such circumstances, without torque reduction from the crankshaft torque capacity-based torque requests made by the TCM 34, the engine 12 would produce torque at the crankshaft 22 as represented by curve 204, which may be referred to as engine non-transmission regulated steady state torque. Under the method 100, the TCM 34 can use the torque capacity information sent from the ECM 32 to evaluate how to schedule the shift duration, the clutch pressures and the torque request value and type of torque request to be sent to the ECM 34. The torque capacity signals sent from the ECM 32 establish that the crankshaft torque minimum immediate capacity is represented by curve 206, the crankshaft torque minimum run immediate capacity is represented by curve 208, and the crankshaft torque minimum off capacity is represented by curve 210. Thus, the range of spark authority available by operating at the crankshaft torque minimum immediate capacity is the amount of torque reduction between curve 204 and curve 206. If the airflow is reduced during the shift in combination with retarding spark, the crankshaft torque can be reduced further to the crankshaft torque minimum run immediate capacity represented by curve 208. If the fuel is disabled, the torque can be taken down to the crankshaft torque minimum off capacity represented by curve 210.

In the example above, the transmission immediate torque request is represented by curve 212 and is sent to the ECM 32 as the immediate torque request value and the immediate torque response type as discussed with respect to block 116 of the method 100. The requested torque reduction begins at some time 214 which may be coincident with or just after recognition of a shift command. Because the TCM 34 has information from the ECM 32 regarding the crankshaft torque minimum immediate capacity curve 206, the crankshaft torque minimum run immediate capacity curve 208, and the crankshaft torque minimum off capacity curve 210, the TCM 34 can determine that the transmission immediate torque request 212 with the desired shift qualities can be achieved within the range of torque reduction available with reduction by the spark actuator only on a gas internal combustion engine because there is enough torque reduction range above the crankshaft torque minimum immediate capacity curve 206 to satisfy the most extreme portions of the transmission immediate torque request (i.e., the lowest portions of curve 212). Such a spark-only torque reduction may be advantageously carried out when possible because the torque characteristics of spark reduction are a fast reduction with a fast return of torque (i.e., a quick removal of torque reduction when the transmission torque request for torque reduction by the spark actuator is stopped, such at as the end of the shift). The torque can be returned to driver intent levels quickly because the airflow was not modified. However, the range of reduction may not be sufficient to provide fast shift times.

FIG. 5 is another diagram of a transmission immediate torque request during a "power on" transmission upshift with torque reduction. In FIG. 5, the transmission immediate torque request 216 requires a greater torque reduction range, as the lowest torque requested on curve 216 is lower than that requested on curve 212 in FIG. 4. Assuming the same engine operating conditions as in FIG. 4, the TCM 34 determines that the desired shift qualities cannot be achieved within the range of spark reduction only for a gas internal combustion engine because there is not enough torque reduction range above the crankshaft torque minimum immediate capacity curve 206 of FIG. 4 to satisfy curve 216. However, the TCM 34 determines that there is enough range above crankshaft torque minimum run immediate capacity curve 208. Therefore, the TCM 34 schedules a predicted torque request as described with respect to block 114 of the method 100, as transmission predicted crankshaft torque request 218 to provide greater torque reduction range by using the airflow actuator. Use of the airflow actuator has a synergistic effect by causing the crankshaft torque minimum immediate capacity curve 206 of FIG. 4 to move downward, as represented by curve 220 of FIG. 5, toward crankshaft torque minimum run immediate capacity curve 208, affording more immediate torque reduction range to satisfy the immediate torque request 216.

In FIG. 5, the predicted torque request 218 leads the transmission immediate crankshaft torque request 216 slightly. This is done in light of the inherent delays in airflow control. The air torque, which is the torque at current airflow with optimum spark and all cylinders 46 being fueled, is shown with curve 222. If the predicted torque request 218 leads the immediate torque request 216 by too much on the initial torque reduction (i.e., the left side of the curve 216 in FIG. 5) then the airflow torque will bring the engine torque production below the desired immediate crankshaft torque request from the TCM 34, potentially creating a sag in axle torque on the shift that is noticeable to the vehicle driver. If the predicted torque request 218 does not lead the immediate torque request 216 sufficiently, however, then the torque reduction due to the airflow actuator stemming from the predicted torque request 218 will occur too late and the engine 12 will take longer to achieve the torque reduction that the TCM 34 desires.

When exiting the shift (increasing torque toward the driver-requested torque (i.e., the engine nontransmission-regulated steady state torque curve 204) the predicted torque request 218 also leads the immediate torque request 216. If the predicted torque request 218 leads the immediate torque request 216 by too much as torque is increasing, the crankshaft torque minimum immediate capacity curve 220 will rise too quickly and a push will be felt on the shift because the engine 12 will produce too much torque. This is because, as discussed above, the air torque actuator has an influence on the crankshaft torque minimum immediate torque capacity 220 by decreasing the range of the crankshaft torque minimum immediate torque capacity as shown at curve 220 when the predicted crankshaft torque request 218 is decreasing and increasing the range of crankshaft torque minimum immediate torque capacity curve 220 when the predicted crankshaft torque request 218 is increasing. If the predicted crankshaft torque request 218 does not lead the immediate torque request 216 enough on the increasing slope, the air torque response will cause the torque increase to be below the desired response and the driver will experience a sag in axle torque.

The response in time of crankshaft torque to a predicted torque request can vary based on many factors because of the nature of airflow control. The largest factor tends to be engine speed as the air torque response is slower at lower engine speeds. Performing shifts with a torque reduction achieved through both a predicted torque reduction (i.e., through use of the airflow actuator 50) can provide more overall reduction than with immediate torque reduction alone (i.e., than with the use of the spark actuator 52 or fuel actuator 56 alone or in combination). However, closer coordination of the torque requests is required due to the nature of the response to predicted torque requests on spark-ignited engines.

FIG. 6 is another diagram of a transmission immediate torque request illustrated by curve 224 during a "power on" transmission upshift with torque reduction. The TCM 34 cannot achieve the desired shift qualities within the range of spark and airflow reduction because there is not enough torque reduction range above crankshaft torque minimum run immediate capacity curve 208. Operating at torques in the area 226 between the crankshaft torque minimum run immediate capacity curve 208 and the crankshaft torque minimum off capacity curve 210 is not permitted in this embodiment by the ECM 32 because doing so would require that engine misfire diagnostics be disabled. Accordingly, the TCM 34 must decide whether to request continued fueling of the engine 12 during the shift and request torque at or above the crankshaft torque minimum run immediate capacity curve 208 with transmission immediate crankshaft torque request response type equal to pleasability-limited, or to employ the fuel cutoff actuator 56 and request torque at the crankshaft torque minimum off capacity curve 210 with transmission immediate crankshaft torque request response type equal to maximum range. The TCM 34 may look to other inputs such as driver-requested torque, current crankshaft torque and engine speed as factors in making this decision. In the example of FIG. 6, the transmission immediate crankshaft torque request made by the TCM 34 is with response type set to maximum range for fuel cut off. Additionally, the TCM 34 could use this achievable torque level to recalculate the expected shift time and schedule clutch pressures accordingly. In another example, a predicted torque request for maximum torque limit could be requested in addition to the immediate torque request for maximum range fuel cutoff. This may further reduce torque and increase torque reduction range because of cylinder pumping losses contributing to torque reduction even with fuel cutoff. This may reduce the amount of fuel that needs to be added to the system after fuel is returned to restore the catalysts efficiency.

While the best modes for carrying out the invention have been described in detail, those familiar with the art to which this invention relates will recognize various alternative designs and embodiments for practicing the invention within the scope of the appended claims.

The invention claimed is:

1. A control system for use with an engine and a transmission in a vehicle comprising:
at least one controller having a processor with at least one stored algorithm that:
determines different crankshaft torque capacities associated with different respective engine torque actuators, including a first torque actuator and at least one additional torque actuator;
determines a torque actuation range over which to modify crankshaft torque during an oncoming shift of the transmission;
requests crankshaft torque modification by use of at least one of the first torque actuator and the at least one additional torque actuator based at least partially on the torque actuation range and the crankshaft torque capacities;
wherein a request for crankshaft torque modification by use of said at least one additional torque actuator includes a requested torque value and a requested torque response type; and wherein the torque response type is one of no torque intervention, a limited range of reduction request, a maximum range of reduction request, and an automatic actuator selection request that instructs modification of a requested torque value for the first torque actuator to ensure that the requested torque value for said at least one additional torque actuator is achieved.

2. The control system of claim 1, wherein the first torque actuator is an airflow actuator and said at least one additional torque actuator includes a spark actuator and a fuel actuator.

3. The control system of claim 2, wherein crankshaft torque modification by use of the airflow actuator is requested prior to crankshaft torque modification by use of said at least one additional torque actuator.

4. The control system of claim 2, wherein the fuel actuator is configured to shutoff fuel to engine cylinders; and wherein the algorithm requires fuel shutoff to all engine cylinders of the engine when crankshaft torque modification by use of the fuel actuator is requested.

5. The control system of claim 1, wherein a request for crankshaft torque modification by use of the first torque actuator includes a requested torque value and a requested torque intervention type; and wherein the requested torque intervention type for the request for crankshaft torque modification by use of the first torque actuator is one of no torque intervention, a maximum torque limit, and a minimum torque limit.

6. The control system of claim 1, wherein said at least one additional torque actuator includes at least one of a spark actuator and a fuel actuator.

7. The control system of claim 1, wherein the torque actuation range is further based at least partially on one of a target gear of the upshift, a desired shift duration, and a vehicle operating condition indicative of an operator intent regarding shift duration.

8. The control system of claim 1, wherein the different crankshaft torque capacities include a crankshaft torque at current airflow in the engine with a minimum spark in the engine, a crankshaft torque at a minimum airflow in the engine and the minimum spark in the engine, and a crankshaft torque at the minimum airflow in the engine and with fuel shutoff in the engine.

9. The control system of claim 8, wherein the vehicle is a hybrid vehicle and wherein the crankshaft torque at current airflow in the engine with a minimum spark in the engine includes a maximum negative torque from an electric motor contributing to the crankshaft torque.

10. A method of controlling crankshaft torque comprising:
determining different crankshaft torque capacities associated with different crankshaft torque actuators; wherein the different crankshaft torque actuators include an airflow actuator, a spark actuator and a fuel actuator;
determining a torque actuation range over which to modify crankshaft torque during an oncoming shift of the transmission based on at least one of a target gear of the shift, a desired shift duration, and a vehicle operating condition indicative of an operator intent regarding shift duration;
requesting crankshaft torque modification by use of at least one of the airflow actuator, the spark actuator and the fuel actuator based on the different crankshaft torque capacities and the torque actuation range; and
wherein the different crankshaft torque capacities include a crankshaft torque at current engine airflow with a minimum spark, a crankshaft torque at a minimum engine airflow and the minimum spark, and a crankshaft torque at the minimum engine airflow in the engine and with engine fuel shutoff.

11. The method of claim 10, wherein said requesting includes requesting a torque value and a torque intervention type for the airflow actuator.

12. The method of claim 11, wherein the torque intervention type for the airflow actuator is one of no torque intervention, a maximum torque limit, and a minimum torque limit.

13. The method of claim 10, wherein said requesting includes requesting a torque value and a torque response type for at least one of the spark actuator and the fuel actuator; wherein the torque response type is one of no torque intervention, a limited range of reduction request, a maximum range of reduction request, and an automatic actuator selection request that modifies a requested airflow torque value to ensure that the torque value requested for said at least one of the spark actuator and the fuel actuator is achieved.

14. The method of claim 10, wherein said requesting includes requesting the airflow actuator independently of and prior to requesting the spark actuator and the fuel actuator.

15. The method of claim 10, wherein the fuel actuator is configured to shutoff fuel to engine cylinders; and wherein fuel shutoff is to all engine cylinders when crankshaft torque modification by use of the fuel actuator is requested to provide the torque actuation range.

16. A control system for a vehicle powertrain having an engine and a transmission comprising:
an engine controller having a first processor with a first stored algorithm that determines different crankshaft torque capacities associated with different respective torque actuators; wherein the torque actuators include an airflow actuator, a spark actuator and a fuel actuator;
a transmission controller having a second processor with a second stored algorithm;
wherein the engine controller is operatively connected to the transmission controller and configured to communicate the different crankshaft torque capacities to the transmission controller;
wherein the second stored algorithm determines a torque actuation range over which to reduce crankshaft torque during an oncoming upshift of the transmission based on at least one of a target gear of the upshift, a desired duration of the upshift, and a vehicle operating condition indicative of an operator intent regarding duration of the upshift;
wherein the second stored algorithm determines requests for timing, torque value, and torque intervention or response type for the airflow actuator and at least one of the spark actuator and the fuel actuator; wherein the requests are based at least partially on the crankshaft torque capacities and the torque actuation range;
wherein the transmission controller is configured to communicate the requests to the engine controller; and
wherein the engine controller prioritizes the requests by comparison to other predetermined propulsion torque requests and commands actuation of the torque actuators based on the prioritized requests.

* * * * *